Figure 1:
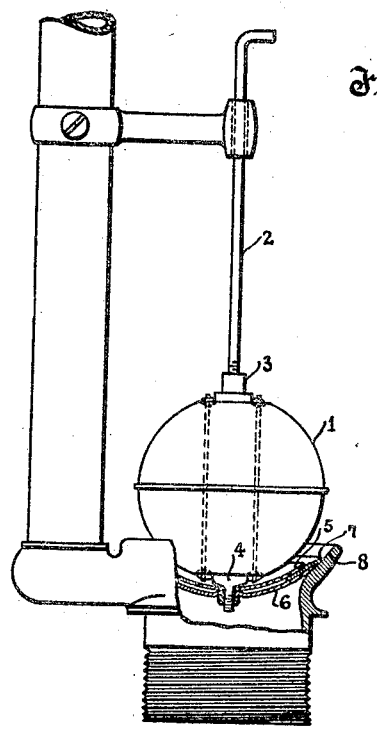

Jan. 22, 1924.

A. B. SCHIER 1,481,563

FLOAT VALVE

Filed Aug. 16, 1922

INVENTOR.
Adolph B. Schier
BY Frank H. Hubbard
ATTORNEY.

Patented Jan. 22, 1924.

1,481,563

UNITED STATES PATENT OFFICE.

ADOLPH B. SCHIER, OF MILWAUKEE, WISCONSIN.

FLOAT VALVE.

Application filed August 16, 1922. Serial No. 582,141.

*To all whom it may concern:*

Be it known that I, ADOLPH B. SCHIER, a citizen of the United States, residing at Milwaukee, in the county of Milwaukee and State of Wisconsin, have invented new and useful Improvements in Float Valves, of which the following is a full, clear, concise, and exact description, reference being had to the accompanying drawing, forming a part of this specification.

This invention relates to float valves and is particularly applicable to flushing tank valves.

An object of the present invention is to provide an improved valve of the character covered by my prior Patent No. 1,230,929, granted June 26, 1917, such valve comprising a metal ball float having attached thereto a leather or other suitable washer supported centrally by a washer of more rigid material preferably of convexo-concave form and preferably of metal, the latter washer being provided to engage the valve seat in advance of the more flexible washer for centering the valve and substantially closing the outlet port which is thereafter tightly sealed by the more flexible washer.

Another object is to provide a valve of the aforementioned character which will readily adapt itself to widely varying irregularities in the valve seats afforded the same.

Another object is to provide a valve of such character which will be more rugged and durable in service.

Other objects and advantages will appear.

The accompanying drawing illustrates a preferred embodiment of the invention which will now be described it being understood that the embodiment illustrated is susceptible of modification without departing from the scope of the appended claims.

Figure 2:
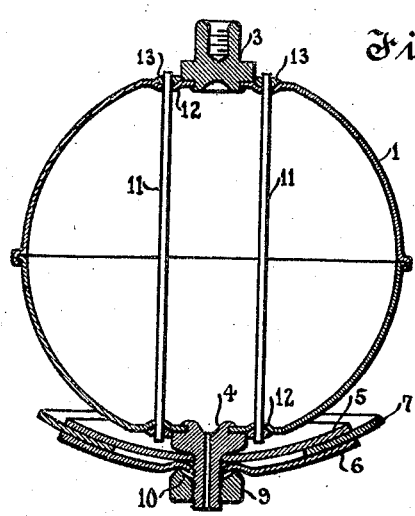

In the drawing,

Figure 1 shows partially in elevation and partially in section a valve mounted in a flushing tank fitting of a well known type; and Fig. 2 shows the float valve in section.

Referring to the drawing the float valve comprises a metal ball float 1 having a supporting stem 2 threading into a nipple 3 provided thereon, said float also having a diametrically opposed nipple 4 upon which are clamped washers 5 and 6 preferably of metal and an interposed washer 7 preferably of leather, the latter washer being of greater diameter than the former washers and being marginally free.

The washers 5 and 6 which are preferably of convexo-concave form and spaced from the float are constructed of resilient material preferably phosphor-bronze whereby they will yield to conform to irregularities in the valve seat 8 and yet resume their original form when withdrawn from the valve seat. Thus regardless of the rotary relation of the valve and its seat the former will always fit the latter to effect centering and to substantially close the outlet port which as stated is finally tightly sealed by the leather washer. When so constructed the valve will function to effect a tight seal even where the valve seat is badly deformed. Also the resiliency of the washers otherwise improves the action of the valve and increases its durability in service. In forming the resilient washers by spinning I have found it very advantageous to roughen the form upon which they are spun whereby they may be readily formed of material having greater resiliency.

In practice the leather washer is preferably of annular form as shown to be clamped between the metal washers at a distance from their axis and to permit the metal washers to be directly engaged and clamped against the nipple 4. Also in practice the nipple 4 is preferably provided with a convex surface against which the metal washers are clamped by a nut 9 threading onto said nipple and preferably having its end recessed to provide an annular shoulder 10 to clamp the washers against the convex surface of the nipple. Such provisions are advantageous in that they tend to prevent lateral play of the washers on the nipple and to minimize restriction of flexing of the washers, the clamping parts being preferably of minimum practical diameters.

The float is preferably reinforced by passing therethrough a pair of metal rods 11 of suitable size and soldering or otherwise securing the ends thereof to opposite walls of the float. As illustrated the float is provided with annular depressions 12 surrounding the nipples and the float is pierced to receive the ends of rods 11 in such depressions which serve as pockets for the solder 13 employed to secure the rods and to seal the openings provided therefor in the float. Also it is preferable to locate the rods in close proximity to the nipples whereby the solder reinforces the connections between said nipples and the float. Floats so reinforced have been found to withstand severe strains and have proven exceedingly durable in service.

As above set forth it is to be understood that the embodiment illustrated is susceptible of various modifications without departing from the scope of the appended claims.

What I claim as new and desire to secure by Letters Patent is:

1. A float valve comprising a ball float, a resilient washer centrally attached thereto in a spaced relation therewith and an interposed flexible washer concentric with said resilient washer and of relatively greater diameter.

2. A float valve comprising a ball float having substantially diametrically disposed reinforcing means, a resilient washer centrally attached to said float in a spaced relation therewith and substantially in line with the reinforcing means thereof and an interposed flexible washer concentric with said resilient washer and of relatively greater diameter.

3. A float valve comprising a ball float, a resilient washer of convexo-concave form attached centrally to said float in a spaced relation therewith and a flexible washer nested in said resilient washer and having a free margin extending therebeyond.

4. A float valve comprising a ball float and concentric resilient washers and an interposed flexible washer attached to said float in a spaced relation therewith, said flexible washer being of greater diameter than said resilient washers.

5. A float valve comprising a ball float, nesting resilient washers of convexo-concave form, a flexible washer interposed between the former washers and having a diameter such that it is marginally free and means for clamping said washers to said float in a spaced relation therewith.

6. A float valve comprising a ball float, nesting resilient washers of convexo-concave form, a flexible washer interposed between the former washers and having a diameter such that it is marginally free and means for clamping said washers to said float in a spaced relation therewith, said means including a clamping nut having an annular shoulder to grip the outer washer.

7. A float valve comprising a ball float having a substantially diametrically disposed strengthening member terminally secured to opposite walls thereof and having an actuating member attached thereto adjacent one terminal of said strengthening member and nested washers of flexible and resilient material respectively fixed to said float adjacent the opposite terminal of said strengthening member.

In witness whereof, I have hereunto subscribed my name.

ADOLPH B. SCHIER.